United States Patent
Heraud et al.

(10) Patent No.: US 10,793,787 B2
(45) Date of Patent: Oct. 6, 2020

(54) PROCESS FOR THE PRODUCTION OF OLEFINS AND OF MIDDLE DISTILLATES FROM A HYDROCARBON EFFLUENT RESULTING FROM THE FISCHER-TROPSCH SYNTHESIS

(71) Applicant: IFP Energies Nouvelles, Rueil-Malmaison (FR)

(72) Inventors: Jean-Philippe Heraud, Rueil-Malmaison (FR); Pascal Etienne, Rueil-Malmaison (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 0 days.

(21) Appl. No.: 16/513,106

(22) Filed: Jul. 16, 2019

(65) Prior Publication Data
US 2020/0024528 A1 Jan. 23, 2020

(30) Foreign Application Priority Data
Jul. 18, 2018 (FR) ........................................ 1856667

(51) Int. Cl.
*C10G 55/06* (2006.01)
*B01J 29/40* (2006.01)
(Continued)

(52) U.S. Cl.
CPC .............. *C10G 55/06* (2013.01); *B01J 29/40* (2013.01); *C10G 47/16* (2013.01); *C10G 49/22* (2013.01);
(Continued)

(58) Field of Classification Search
CPC ........ C10G 11/18; C10G 45/64; C10G 47/00; C10G 47/16; C10G 49/22; C10G 55/06;
(Continued)

(56) References Cited

U.S. PATENT DOCUMENTS

| 4,125,566 A | 11/1978 | Trin Dinh et al. |
| 7,658,836 B2 | 2/2010 | Euzen et al. |
| 2004/0087824 A1* | 5/2004 | O'Rear ................... C07C 11/02 585/651 |

FOREIGN PATENT DOCUMENTS

| FR | 2362208 A1 | 3/1978 |
| FR | 2888584 A1 | 1/2007 |

OTHER PUBLICATIONS

Machine translation of JP 4829659, which is the later publication of JP 2007269926, published Oct. 18, 2007.*
(Continued)

*Primary Examiner* — Brian A McCaig
(74) *Attorney, Agent, or Firm* — Millen, White, Zelano and Branigan, P.C.

(57) ABSTRACT

Process for the production of olefins and of middle distillates from a paraffinic feedstock, in which:
a) a paraffinic feedstock resulting from a Fischer-Tropsch unit is recovered, the said feedstock containing a light fraction and a heavy fraction;
b) the light fraction is sent to a catalytic cracking unit;
c) the effluent resulting from the catalytic cracking unit is separated in a fractionation unit in order to obtain a fraction of light hydrocarbons, an olefinic fraction and a residual liquid fraction;
d) the heavy fraction is sent to a hydrocracking/hydroisomerization unit;
e) the effluent resulting from the hydrocracking/hydroisomerization unit is separated in a fractionation unit in order to obtain a middle distillates fraction, a naphtha cut having a maximum boiling point of less than 180° C. and an unconverted heavy fraction;
f) a part of the naphtha cut resulting from the fractionation unit is sent to the catalytic cracking unit.

13 Claims, 2 Drawing Sheets

(51) Int. Cl.
*C10G 47/16* (2006.01)
*C10G 49/22* (2006.01)
*C10G 69/10* (2006.01)

(52) U.S. Cl.
CPC ..... *C10G 69/10* (2013.01); *C10G 2300/1022* (2013.01); *C10G 2400/02* (2013.01); *C10G 2400/20* (2013.01)

(58) Field of Classification Search
CPC ........ C10G 69/04; C10G 69/10; C10G 69/14; C10G 2300/1022; C10G 2400/02; C10G 2400/20; B01J 29/40
See application file for complete search history.

(56) References Cited

OTHER PUBLICATIONS

Rao et al: "Fluid catalytic cracking: Processing opportunities for Fischer-Tropsch waxes and vegetable oils to produce transportation fuels and light olefins" ; Microporous and Mesoporous Materials vol. 164, Dec. 1, 2012, pp. 148-163.
Search report in FR1856667 dated Mar. 27, 2019 (pp. 1-2).

* cited by examiner

PROCESS FOR THE PRODUCTION OF OLEFINS AND OF MIDDLE DISTILLATES FROM A HYDROCARBON EFFLUENT RESULTING FROM THE FISCHER-TROPSCH SYNTHESIS

FIELD OF THE INVENTION

The present invention relates to a process for the manufacture of olefins and of middle distillates from a hydrocarbon effluent resulting from the Fischer-Tropsch synthesis.

STATE OF THE ART

The Fischer-Tropsch (FT) process makes it possible to produce synthetic hydrocarbons from a gaseous feedstock predominantly composed of hydrogen and of carbon monoxide, also known as synthesis gas ($CO+H_2$).

In particular, in the low-temperature Fischer-Tropsch process, the synthesis gas ($CO+H_2$) is converted catalytically into water, oxygen-comprising products and hydrocarbons in the gas, liquid or solid form under standard conditions. After separation of the water, the synthetic hydrocarbons obtained are predominantly composed of predominantly linear paraffins but also contain olefins and oxygen-comprising products.

Generally, the effluent resulting from the Fischer-Tropsch process, at the outlet of the unit, comprises at least two fractions: a light fraction, known as condensates, and a heavy fraction, known as waxes. These synthetic hydrocarbons produced cannot be directly incorporated in conventional fuel pools or used as lubricants. By way of example, the pour point of a paraffin comprising 20 carbon atoms and having a boiling point at 340° C. is approximately 37° C., which makes its direct incorporation in the gas oil cut impossible due to the required specification of −15° C. A hydroisomerization stage is necessary in order to lower the pour points of the different hydrocarbon compounds. Moreover, treatment stages are necessary in order to remove the olefinic and oxygen-comprising compounds, to increase the yield of middle distillates and to improve the properties of the kerosene and gas oil cuts in order to observe the specifications.

Furthermore, the products of the Fischer-Tropsch reaction can advantageously be used in the production of olefins and can increase the yield of light olefins (for example, $C_2$-$C_4$ olefins). In addition, the use of synthetic naphtha resulting from the Fischer-Tropsch reaction in the production of olefins reduces the amounts of carbon dioxide and of aromatic byproducts, in comparison with the use of a naphtha derived from crude oil. Typically, synthetic naphtha is sent to a steam cracking unit in order to form olefins. For example, the document U.S. Pat. No. 7,279,610 describes a process for the production of ethylene, of propylene and of butylene by steam cracking starting from a hydrocarbon feedstock of naphtha type produced by Fischer-Tropsch synthesis. In this process, the heavy fraction having an initial boiling point of greater than 150° C. and a final boiling point of less than 400° C. is subjected to steam cracking in a steam cracking furnace designed for naphtha. The document U.S. Pat. No. 7,763,763 describes a process for the production of olefins by steam cracking a Fischer-Tropsch effluent. In this process, the Fischer-Tropsch effluent first has to be fractionated to give two streams, a heavy fraction and a light fraction. In this process, the feedstock to be treated corresponds to a combined stream of the light fraction resulting from the fractionation of the Fischer-Tropsch effluent and of the upgraded heavy fraction (obtained after a stage of hydrocracking/hydroisomerization of the heavy fraction resulting from the fractionation of the Fischer-Tropsch effluent). However, these processes are carried out using steam cracking furnaces which are also designed to operate according to "high severity" conditions. However, the processes employing these steam cracking furnaces can exhibit serious disadvantages, such as major phenomena of coking inside the cracking tube and an effect of premature ageing of the steam cracking plants. Furthermore, these steam cracking processes produce numerous light cracked products which cannot be incorporated in the petrol pool.

Subject-Matters of the Invention

One objective of the present invention is thus to provide a process for the production of olefins and of middle distillates from a paraffinic effluent produced by the Fischer-Tropsch synthesis in a judicious sequence of stages making possible the treatment of the light fraction (condensate) and the treatment of the heavy fraction (waxes) which makes it possible simultaneously to maximize the production of middle distillates and to limit the production of light cracked products which cannot be incorporated in a petrol pool and thus to improve the selectivity with regard to the production of middle distillates base, while maximizing the production of light olefins.

A subject-matter of the present invention is a process for the production of olefins and of middle distillates from a paraffinic feedstock produced by Fischer-Tropsch synthesis comprising at least the following stages:
a) the said paraffinic feedstock resulting from a Fischer-Tropsch unit (A) is recovered, the said paraffinic feedstock comprising at least a light fraction, known as condensate, and a heavy fraction, known as waxes;
b) at least a part of the said light fraction is sent to a catalytic cracking unit (C);
c) the effluent resulting from the catalytic cracking unit is separated in a fractionation unit (D) in order to obtain at least a fraction comprising light hydrocarbons, at least an olefinic fraction and at least a residual liquid fraction;
d) at least a part of the said heavy fraction is sent to a hydrocracking/hydroisomerization unit (F) in the presence of hydrogen and of a hydrocracking/hydroisomerization catalyst;
e) the effluent resulting from the hydrocracking/hydroisomerization unit is separated in a fractionation unit (G) in order to obtain a middle distillates fraction, a naphtha cut having a maximum boiling point of less than 180° C. and an unconverted heavy fraction;
f) at least a part of the said naphtha cut resulting from the fractionation unit is sent to the catalytic cracking unit (C).

In one embodiment according to the invention:
an additional stage a') is carried out in which the said light fraction obtained in stage a) is fractionated in a fractionation unit (H) in order to obtain a light cut of the said light fraction, the final boiling point of which is less than 180° C., and a heavy cut of the said light fraction, the initial boiling point of which is greater than 120° C.;
a stage b) is carried out in which the said light cut of the said light fraction resulting from stage a') is sent to the said catalytic cracking unit (C).

In one embodiment according to the invention, an additional stage a") is carried out in which the said heavy cut of the said light fraction obtained on conclusion of stage a') is sent to the said hydrocracking/hydroisomerization unit (F), as a mixture with the said heavy fraction resulting from stage a).

In one embodiment according to the invention, a stage g) is carried out in which the said heavy cut of the said light fraction obtained on conclusion of stage a') is sent to a hydrotreating unit (I) in order to obtain a hydrotreated heavy cut of the said light fraction.

In one embodiment according to the invention, a stage h) is carried out in which the said hydrotreated heavy cut of the said light fraction obtained on conclusion of stage g) is sent to an isomerization unit (J).

In one embodiment according to the invention, a stage i) is carried out in which the effluent resulting from the isomerization unit (J) of stage h) is sent to the fractionation unit (G), as a mixture with the effluent resulting from the hydrocracking/hydroisomerization unit (F).

In one embodiment according to the invention, the said light fraction and/or the said heavy fraction obtained on conclusion of stage a) is/are sent, before stage b), to a hydrotreating unit.

In one embodiment according to the invention, the said residual liquid fraction obtained on conclusion of stage c) is recycled, at least in part, in stage b).

In one embodiment according to the invention, the said unconverted heavy fraction obtained on conclusion of stage e) is recycled, at least in part, in stage d).

In one embodiment according to the invention, all of the said naphtha cut resulting from the fractionation unit (G) is sent to the catalytic cracking unit.

In one embodiment according to the invention, the catalytic cracking unit comprises a catalyst comprising a ZSM-5 zeolite.

In one embodiment according to the invention, the catalyst of the hydrocracking/hydroisomerization unit (C) comprises at least one hydro/dehydrogenating metal chosen from the group formed by the metals of Group VIb and of Group VIII and at least one Bronsted acid solid.

In one embodiment according to the invention, the catalyst of the isomerization unit (J) comprises at least one noble metal from Group VIII and a support comprising at least one IZM-2 zeolite and at least one binder.

DETAILED DESCRIPTION OF THE INVENTION

Within the meaning of the present invention, the different embodiments presented can be used alone or in combination with one another, without any limit to the combinations.

Stage a)

In accordance with the invention, the present invention relates to a process for the production of olefins and of middle distillates from a paraffinic feedstock produced by Fischer-Tropsch synthesis comprising at least two fractions and preferably consisting of two fractions: a light fraction, known as condensate, and a heavy fraction, known as waxes.

The Fischer-Tropsch process, which is well known to a person skilled in the art, makes it possible to produce synthetic hydrocarbons from a gaseous feedstock predominantly composed of hydrogen and of carbon monoxide, also known as synthesis gas ($CO+H_2$). The synthesis gas ($CO+H_2$) feeding the Fischer-Tropsch process can advantageously be produced from natural gas, from coal, from biomass, from any source of hydrocarbon compounds or from a mixture of these sources.

In particular, in the low-temperature Fischer-Tropsch process, the synthesis gas ($CO+H_2$) is converted catalytically into water, oxygen-comprising products and hydrocarbons in the gas, liquid or solid form under standard conditions. After separation of the water, the synthetic hydrocarbons obtained are predominantly composed of paraffins but also contain olefins and oxygen-comprising products.

Preferably, the effluent resulting from the Fischer-Tropsch process comprises a content of n-paraffins of greater than 70% by weight and more preferably still of greater than 80% by weight, with respect to the total weight of the said effluent.

Preferably, the paraffinic effluent resulting from the Fischer-Tropsch process is free of heteroatomic impurities, such as, for example, sulfur, nitrogen or metals.

In accordance with the invention, the paraffinic effluent resulting from the Fischer-Tropsch process, at the outlet of the Fischer-Tropsch synthesis unit (A), comprises at least two fractions and preferably consists of two fractions: a light fraction, known as condensate, and a heavy fraction, known as waxes.

The light fraction, known as condensate, corresponds to the hydrocarbons in the gas state under the conditions of the Fischer-Tropsch reaction and the heavy fraction, known as waxes, corresponds to the hydrocarbons in the liquid state under the conditions of the Fischer-Tropsch reaction.

The condensate light fraction advantageously exhibits an initial boiling point T1 of between 15 and 50° C. and preferably between 25 and 40° C. and a final boiling point T2 of between 350° C. and 400° C. and preferably between 360° C. and 380° C. and preferably of less than 370° C.

The waxes heavy fraction advantageously exhibits an initial boiling point T2 of between 100 and 300° C. and preferably between 125 and 200° C., the said heavy fraction preferably corresponding to a paraffinic fraction having a number of carbon atoms of greater than 8. This heavy fraction has the distinguishing feature, due to its composition, formed of n-paraffins having a high number of carbon atoms which can range up to more than 150, of being solid at ambient temperature.

In the light fraction, the content of paraffins is greater than 70% by weight, with respect to the total weight of the said light fraction, the content of olefins is less than 20% by weight and the content of oxygen-comprising compounds is less than 10% by weight, the contents being expressed as percentage by weight with respect to the total weight of the said light fraction.

In the heavy fraction, the content of paraffins is greater than 80% by weight, the content of olefins is less than 15% by weight and the content of oxygen-comprising compounds is less than 5% by weight, the contents being expressed as percentage by weight with respect to the total weight of the said heavy fraction.

The process according to the invention can comprise a stage in which the light fraction resulting from stage a) is sent to a hydrotreating unit (B) in the presence of a hydrotreating catalyst and which operates at a temperature of between 250 and 450° C., at a pressure of between 0.5 and 15 MPa, at a hydrogen flow rate adjusted in order to obtain a ratio of between 100 and 3000 standard litres per litre, and at an hourly space velocity of between 0.1 and 40 $h^{-1}$.

Preferably, the hydrotreating stage is carried out at a temperature of between 300 and 400° C. and preferably between 330 and 360° C., at a pressure of between 0.5 and 0.7 MPa, at a hydrogen flow rate adjusted in order to obtain a ratio of between 250 and 2000 standard litres per litre and preferably between 500 and 1500 standard litres per litre, and at an hourly space velocity of between 0.25 and 20 $h^{-1}$ and preferably between 0.5 and 10 $h^{-1}$. The effluent resulting from the hydrotreating unit (B) can advantageously be sent to a stage of removal of at least a part of the water formed during the hydrotreating stage and preferably of all of the water formed, before being sent to the catalytic cracking stage b) according to the invention.

The said stage of removal of at least a part of the water can advantageously be carried out by any method and technique known to a person skilled in the art, for example by drying, passing over a desiccant, flash distillation or separation by settling.

The process according to the invention can also comprise a stage in which the heavy fraction resulting from stage a) is sent to a hydrotreating unit (E), under the same operating conditions as described above. The said hydrotreating stage makes it possible to reduce the content of olefinic and unsaturated compounds and also to optionally decompose the oxygen-comprising compounds present in the light and/or heavy fraction resulting from stage a).

The hydrotreating catalyst employed in the hydrotreating stages is a conventional hydrotreating catalyst. The said catalyst comprises at least one metal from Group VIII and/or from Group VI of the Periodic Table of the Elements. Preferably, the catalyst comprises at least one metal from the group of metals formed by nickel, molybdenum, tungsten, cobalt, ruthenium, indium, palladium and platinum, alone or as a mixture, and comprises at least one support chosen from aluminas, boron oxides, magnesia, zirconia, titanium oxides and clays or a combination of these oxides; preferably, the said support is an alumina. The said catalysts can advantageously be prepared by any method known to a person skilled in the art or else can be acquired from companies which are specialists in the manufacture and the sale of catalysts.

In the case of the use of non-noble metals from Group VIII, a combination of at least one metal from group VI, preferably molybdenum or tungsten, and of at least one metal from Group VIII, preferably cobalt and nickel, of the Periodic Table of the Elements is advantageously used. The concentration of non-noble metal from Group VIII, when the latter is used, is advantageously from 0.01% to 15% by weight of oxide equivalent, with respect to the finished catalyst, and that of the metal from Group VI is advantageously from 5% to 40% by weight of oxide equivalent, with respect to the finished catalyst. When a combination of metals from Group VI and from Group VIII is used, the catalyst is then preferably used in a reduced form.

Under these conditions, the content of unsaturated and oxygen-comprising molecules in the effluent resulting from the hydrotreating stage is reduced to less than 0.5% by weight and to approximately less than 0.1% by weight in general, with respect to the total weight of the effluent.

When the heavy fraction resulting from stage a) is sent to a hydrotreating unit (E), the effluent resulting from the hydrotreating unit (E) can advantageously be sent to a stage of removal of at least a part of the water formed during the hydrotreating stage and preferably of all of the water formed, before being sent to the hydrocracking/hydroisomerization stage d) according to the invention.

The said stage of removal of at least a part of the water can advantageously be carried out by any method and technique known to a person skilled in the art, for example by drying, passing over a desiccant, flash distillation or separation by settling.

Stage a') (Optional)

In one embodiment according to the invention, an additional stage a') is carried out in which the said light fraction obtained in conclusion of stage a) is fractionated in a fractionation unit (H) in order to obtain a light cut of the said light fraction, the final boiling point of which is less than 180° C., and a heavy cut of the said light fraction, the initial boiling point of which is greater than 120° C. In this embodiment, the said light cut of the said light fraction can be sent to the catalytic cracking unit (C) [stage b) of the process according to the invention], under the same operating conditions presented below. Before being sent to the catalytic cracking unit (C), the light cut of the light fraction can be sent to a hydrotreating unit (B), under the same operating conditions as described in the section of stage a) of the process according to the invention above.

In one embodiment according to the invention, the heavy cut of the said light fraction can be sent to the hydrocracking/hydroisomerization stage d), as a mixture with the heavy fraction resulting from stage a) of the process according to the invention, as described in detail below. The said heavy cut of the said light fraction can be sent to a hydrotreating unit (E), as a mixture with the heavy fraction resulting from stage a) of the process according to the invention, before being sent to the hydrocracking/hydroisomerization stage d).

In one embodiment according to the invention, the heavy cut of the said light fraction can be sent to stage g) of hydrotreating the said cut and then the effluent resulting from this hydrotreating stage can be sent to the isomerization stage h), as described in detail below.

Stage b)

In one embodiment according to the invention, the process comprises a stage b) in which at least a part and preferably all of the said light fraction is sent to a catalytic cracking unit (C), and more particularly a unit for the catalytic cracking of naphtha (also known as NCC for Naphtha Catalytic Cracking).

The NCC unit is a specific catalytic cracking unit which can be regarded as a variation of an FCC catalytic cracking unit, the distinguishing feature of which is to crack very light paraffinic feedstocks (petrol) in order to produce light olefins. The NCC unit has at least one main reactor operating either in upward flow (riser) or in downward flow (downer). The NCC unit has a separation-stripping section in which the catalyst is separated from the hydrocarbon effluents. In addition, it has a section for regeneration of the catalyst in which the coke formed during the reaction and deposited at the surface of the catalyst is incinerated in order, on the one hand, to give the catalyst its activity and, on the other hand, to produce the heat necessary for the vaporization of the feedstock and for the endothermicity of the cracking reaction.

The NCC unit is preferably operated at high severity, that is to say at a high reactor outlet temperature (ROT) and at a high ratio of catalyst to feedstock (C/O) flow rates by weight. The broad range of operating conditions of the NCC unit is given in Table 1 below:

TABLE 1

| Range of the operating conditions of the NCC unit | | |
| --- | --- | --- |
| Condition | Min | Max |
| ROT, ° C. | 500 | 750 |
| C/O, (kg/h)/(kg/h) | 5 | 40 |

Preferably, the reactor outlet temperature is between 600° C. and 730° C. and the C/O ratio is between 10 and 35 and more preferably between 15 and 30.

The catalyst can be any type of catalytic cracking catalyst, preferably containing a high proportion of zeolite. It may or may not have ZSM-5 added to it and may even be 100% composed of ZSM-5.

In the embodiment in which a stage a') is carried out in which the light fraction obtained on conclusion of stage a) is fractionated in a fractionation unit (H) in order to obtain a light cut of the said light fraction, the final boiling point of which is less than 180° C., and a heavy cut of the said light fraction, the initial boiling point of which is greater than 120° C., the said light cut of the said light fraction is then sent to the catalytic cracking unit (C) (stage b)), under the same operating conditions presented above.

Stage c)

According to the invention, the effluent resulting from the catalytic cracking unit (C) is separated in a fractionation unit (D) in order to obtain at least a fraction comprising light hydrocarbons (comprising in particular hydrogen, methane, ethane, propane, butane), at least an olefinic fraction (comprising in particular ethylene, propylene, C4 olefinics) and at least a residual liquid fraction comprising C5+ hydrocarbon compounds.

The residual liquid fraction is at least partially and preferably completely recycled in the catalytic cracking stage b) of the process according to the invention in order to increase the yield of olefins.

Stage d)

In one embodiment according to the invention, the process comprises a stage d) in which at least a part and preferably all of the heavy fraction of the waxes resulting from stage a), optionally as a mixture with at least a part and preferably all of the heavy cut of the light fraction obtained on conclusion of the optional stage a'), is sent to a hydrocracking and hydroisomerization unit (F) in the presence of a hydrocracking and hydroisomerization catalyst and which operates at a temperature of between 250° C. and 450° C., at a pressure of between 0.2 and 15 MPa, at an hourly space velocity of between 0.1 $h^{-1}$ and 10 $h^{-1}$, and at a hydrogen flow rate adjusted in order to obtain a ratio of between 100 and 2000 standard litres of hydrogen per litre of feedstock.

Preferably, stage d) operates at a temperature of between 280 and 450° C. and more preferably still between 320 and 420° C., at a pressure of between 0.5 and 10 MPa, more preferably between 1 and 9 MPa and very preferably between 2 and 8 MPa, at an hourly space velocity of between 0.2 and 7 $h^{-1}$ and more preferably between 0.5 and 5 $h^{-1}$, and at a hydrogen flow rate adjusted in order to obtain a ratio of between 150 and 1500 standard litres of hydrogen per litre of feedstock and more preferably between 300 and 1500 standard litres of hydrogen per litre of feedstock.

The heavy fraction of the waxes sent to stage d) of the process according to the invention is a fraction boiling above the light fraction resulting from the separation stage a).

The said heavy fraction comprises little in the way of olefins and little in the way of oxygen-comprising compounds, these compounds mainly being present in the light cuts produced by the Fischer-Tropsch synthesis.

When the heavy fraction of the Fischer-Tropsch waxes resulting from stage a) according to the invention is subjected to a hydrotreating stage, the said heavy fraction can advantageously be sent to a stage of removal of at least a part and preferably all of the water, before being sent to the hydrocracking and hydroisomerization stage e) according to the invention.

The said stage of removal of at least a part of the water can advantageously be carried out by any method and technique known to a person skilled in the art, for example by drying, passing over a desiccant, flash distillation or separation by settling.

The hydrocracking and hydroisomerization catalyst employed during stage d) advantageously comprises at least one hydro/dehydrogenating metal chosen from the group formed by the metals of Group VIb and of Group VIII of the Periodic Table and at least one Bronsted acid solid, that is to say a solid which can release one or more protons, and optionally a binder.

Preferably, the said hydrocracking and hydroisomerization catalyst comprises either at least one noble metal from Group VIII chosen from platinum and palladium, taken alone or as a mixture, which are active in their reduced form, or at least one non-noble metal from Group VIII chosen from nickel and cobalt in combination with at least one metal from Group VIb chosen from molybdenum and tungsten, taken alone or as a mixture, and preferably used in their sulfided form.

Preferably, the said hydrocracking and hydroisomerization catalyst comprises at least one noble metal from Group VIII chosen from platinum and palladium, taken alone or as a mixture, and preferably platinum, which is/are active in its/their reduced form.

In the case where the said hydrocracking and hydroisomerization catalyst comprises at least one noble metal from Group VIII, the content of noble metal of the said catalyst is advantageously between 0.01% and 5% by weight, with respect to the finished catalyst, preferably between 0.05% and 4% by weight and very preferably between 0.10% and 2% by weight.

In the case where the said hydrocracking and hydroisomerization catalyst comprises at least one metal from Group VIb in combination with at least one non-noble metal from Group VIII chosen from nickel and cobalt, the content of metal from Group VIb of the said catalyst is advantageously, as oxide equivalent, between 5% and 40% by weight, with respect to the finished catalyst, preferably between 10% and 35% by weight, and the content of metal from Group VIII of the said catalyst is advantageously, as oxide equivalent, between 0.5% and 10% by weight, with respect to the finished catalyst, preferably between 1% and 8% by weight and very preferably between 1.5% and 6% by weight.

The metal function is advantageously introduced onto the catalyst by any method known to a person skilled in the art, such as, for example, cokneading, dry impregnation or impregnation by exchange.

Advantageously, the Bronsted acid solid comprises and preferably consists of silica/alumina or zeolite Y.

Optionally, a binder can also be used during the stage of forming the support. A binder is preferably used when the zeolite is employed. The said binder is advantageously chosen from silica ($SiO_2$), alumina ($Al_2O_3$), clays, titanium oxide ($TiO_2$), boron oxide ($B_2O_3$) and zirconia ($ZrO_2$), taken alone or as a mixture. Preferably, the said binder is chosen from silica and alumina and more preferably still the said binder is alumina in all its forms known to a person skilled in art, such as, for example, γ-alumina.

A preferred hydrocracking and hydroisomerization catalyst according to the invention advantageously comprises at least one noble metal, the said noble metal being platinum, and a Bronsted acid solid of silica/alumina type, without any binder. The silica content of the silica/alumina, expressed as percentage by weight, is generally between 1% and 95%, advantageously between 5% and 95%, preferably between 10% and 80% and more preferably still between 20% and 70% and between 22% and 45%. This silica content is perfectly measured using X-ray fluorescence.

Several preferred catalysts used in the hydrocracking and hydroisomerization stage d) of the process according to the invention are described below.

A preferred hydrocracking and hydroisomerization catalyst used in the process according to the invention comprises a specific silica/alumina. Preferably, the said catalyst comprises from 0.05% to 10% by weight, preferably between 0.1% and 5% by weight, of at least one noble metal from Group VIII, preferably chosen from platinum and palladium (in a preferred way platinum), deposited on a silica/alumina support, without any binder, containing an amount of silica ($SiO_2$) of between 1% and 95%, expressed as percentage by weight, preferably between 5% and 95%, in a preferred way between 10% and 80%, in a very preferred way between 20% and 70% and in an even more preferred way between 22% and 45%, the said catalyst exhibiting:
- a BET specific surface of 100 $m^2/g$ to 500 $m^2/g$, preferably of between 200 $m^2/g$ and 450 $m^2/g$ and very preferably between 250 $m^2/g$ and 450 $m^2/g$,
- a mean diameter of the mesopores of between 3 nm and 12 nm, preferably of between 3 nm and 11 nm and very preferably between 4 nm and 10.5 nm,
- a pore volume of the pores, the diameter of which is between the mean diameter as defined above, decreased by 3 nm, and the mean diameter as defined above, increased by 3 nm, which is greater than 40% of the total pore volume, preferably of between 50% and 90% of the total pore volume and very preferably of between 50% and 70% of the total pore volume,
- a total pore volume of between 0.4 and 1.2 ml/g, preferably between 0.5 and 1.0 ml/g and very preferably between 0.5 and 0.9 ml/g,
- a content of alkali metal or alkaline earth metal compounds of less than 300 ppm by weight and preferably of less than 200 ppm by weight.

The mean diameter of the mesopores is defined as being the diameter corresponding to the cancellation of the curve derived from the mercury intrusion volume obtained from the mercury porosity curve for pore diameters of between 2 and 50 nm. The mean diameter of the mesopores of the catalyst is advantageously measured from the pore distribution profile obtained using a mercury porosimeter.

Preferably, the dispersion of the metal of the said preferred catalyst is advantageously between 20% and 100%, preferably between 30% and 100% and very preferably between 40% and 100%. The dispersion, representing the fraction of metal accessible to the reactant with respect to the total amount of metal of the catalyst, is advantageously measured, for example, by $H_2/O_2$ titration or by transmission electron microscopy.

Preferably, the coefficient of distribution of the noble metal of the said preferred catalyst is greater than 0.1, preferably greater than 0.2 and very preferably greater than 0.4. The distribution of the noble metal represents the distribution of the metal inside the catalyst grain, it being possible for the metal to be well or poorly dispersed. Thus, it is possible to obtain platinum which is poorly distributed (for example detected in a ring, the thickness of which is markedly less than the radius of the grain) but well dispersed, that is to say that all the platinum atoms, located in the ring, will be accessible to the reactants. The coefficient of distribution of the noble metal can be measured by an electron probe microanalyser.

The noble metal salt is advantageously introduced by one of the normal methods used to deposit the metal at the surface of a solid. One of the preferred methods is dry impregnation, which consists of the introduction of the metal salt in a volume of solution which is equal to the pore volume of the weight of solid to be impregnated. Before the reduction operation, the catalyst can advantageously be subjected to a calcination, such as, for example, a treatment under dry air at a temperature of 300 to 750° C. and preferably at a temperature equal to 520° C., for 0.25 to 10 hours and preferably for 2 hours.

Another preferred hydrocracking and hydroisomerization catalyst used in the process according to the invention comprises at least one hydro/dehydrogenating element chosen from the group formed by the elements from Group VIb and from Group VIII of the Periodic Table, from 0.01% to 5.5% by weight of oxide of a doping element chosen from phosphorus, boron and silicon and a non-zeolite support based on silica/alumina containing an amount of greater than 5% by weight and less than or equal to 95% by weight of silica ($SiO_2$), the said catalyst exhibiting the following characteristics:
- a mean mesopore diameter, measured by mercury porosimetry, of between 2 and 14 nm,
- a total pore volume, measured by mercury porosimetry, of between 0.1 ml/g and 0.5 ml/g,
- a total pore volume, measured by nitrogen porosimetry, of between 0.1 ml/g and 0.5 ml/g,
- a BET specific surface of between 100 and 550 $m^2/g$,
- a pore volume, measured by mercury porosimetry, contained in the pores with a diameter of greater than 14 nm, of less than 0.1 ml/g,
- a pore volume, measured by mercury porosimetry, contained in the pores with a diameter of greater than 16 nm, of less than 0.1 ml/g,
- a pore volume, measured by mercury porosimetry, contained in the pores with a diameter of greater than 20 nm, of less than 0.1 ml/g,
- a pore volume, measured by mercury porosimetry, contained in the pores with a diameter of greater than 50 nm, of less than 0.1 ml/g,
- an X-ray diffraction diagram which contains at least the main lines characteristic of at least one of the transition aluminas included in the group composed of α-, ρ-, χ-, η-, γ-, κ-, θ- and δ-aluminas,
- a tapped packing density of greater than 0.7 g/ml.

Another preferred hydrocracking and hydroisomerization catalyst used in the process according to the invention comprises (and preferably is essentially composed of) from 0.05% to 10% by weight and preferably between 0.1% and 5% by weight of at least one noble metal from Group VIII, preferably chosen from platinum and palladium and preferably the said noble metal being platinum, deposited on a silica/alumina support, without any binder, containing an amount of silica ($SiO_2$) of between 1% and 95%, expressed as percentage by weight, preferably between 5% and 95%, in a preferred way between 10% and 80%, in a very preferred way between 20% and 70% and in an even more preferred way between 22% and 45%, the said catalyst exhibiting:
- a BET specific surface of 150 $m^2/g$ to 600 $m^2/g$ and preferably of between 200 $m^2/g$ and 600 $m^2/g$,
- a mean diameter of the mesopores of between 3 nm and 12 nm, preferably of between 3 nm and 11 nm and very preferably between 4 nm and 10.5 nm,
- a pore volume of the pores, the diameter of which is between the mean diameter as defined above, decreased by 3 nm, and the mean diameter as defined above, increased by 3 nm, which is greater than 60% of the total pore volume, preferably greater than 70% of the total pore volume and very preferably greater than 80% of the total pore volume, a total pore volume of less than 1 ml/g, preferably of between 0.1 and 0.9 ml/g and very preferably between 0.2 and 0.8 ml/g, a content of alkali metal or alkaline earth metal compounds of less than 300 ppm by weight and preferably of less than 200 ppm by weight.

Preferably, the dispersion of the said preferred catalyst used in stage b) of the process according to the invention is advantageously between 20% and 100%, preferably between 30% and 100% and very preferably between 40% and 100%.

Preferably, the coefficient of distribution of the noble metal of the said preferred catalyst used in stage d) of the process according to the invention is greater than 0.1, preferably greater than 0.2 and very preferably greater than 0.4. This coefficient of distribution is measured by an electron probe microanalyser.

During this stage d), the fraction entering the reactor undergoes, in contact with the catalyst and in the presence of hydrogen, essentially hydrocracking reactions which, accompanied by hydroisomerization reactions of the n-paraffins, will make it possible to improve the quality of the products formed and more particularly the cold properties of the kerosene and the gas oil, and also to obtain very good yields of middle distillates. The conversion of products having boiling points of greater than or equal to 370° C. to give products having boiling points of less than 370° C. is greater than 50% by weight, often at least 60% and preferably greater than or equal to 70%.

The conversion is defined as:

Conversion of the 370° C.+ to give 370° C.−=[(% by weight of the 370° C.−effluent)−(% by weight of the 370° C.−feedstock)]/[100−(% by weight of the 370° C.−feedstock)], with:

% by weight of the 370° C.−effluent=fraction by weight of compounds having boiling points of less than 370° C. in the effluents, % by weight of the 370° C.− feedstock=fraction by weight of compounds having boiling points of less than 370° C. in the hydrocracking and hydroisomerization feedstock.

The effluent resulting from the hydrocracking and hydroisomerization stage d) no longer contains olefinic compounds and oxygen-comprising compounds and is cracked and isomerized.

Stage e)

The process according to the invention comprises a stage e) in which the effluent resulting from the hydrocracking/hydroisomerization unit is separated in a fractionation unit (G) to give a middle distillates fraction, a naphtha cut having a maximum boiling point of less than 180° C. and an unconverted heavy fraction having an initial boiling point of greater than 340° C., preferably of greater than 370° C. and in a preferred way of greater than 380° C., also known as UCO or "unconverted oil".

The liquid fraction, unconverted residue, (UCO) containing products having an initial boiling point of greater than 340° C., preferably of greater than 370° C. and in a preferred way of greater than 380° C. and resulting from the distillation is at least partially and preferably completely recycled in the hydrocracking and hydroisomerization stage d) of the process according to the invention in order to increase the yield of middle distillates.

Stage f)

According to the invention, at least a part and preferably all of the naphtha cut obtained on conclusion of stage e) is sent to stage b) in the catalytic cracking unit (C). This is because the use of the naphtha cut obtained in stage e) makes it possible to maximize the production of olefins while keeping the yield of middle distillates constant.

Stage g) (Optional)

The process according to the invention can optionally comprise a stage in which at least a part and preferably all of the heavy cut of the light fraction resulting from stage a') is sent to a hydrotreating unit (I), prior to the hydroisomerization stage h). In the case where it is carried out, the hydrotreating stage is advantageously carried out under operating and catalytic conditions identical to those employed for the stages of hydrotreating the light fraction and/or the heavy fraction resulting from stage a), as are described above. The hydrotreating catalyst used in this hydrotreating stage can advantageously be identical to or different from those employed in the stages of hydrotreating the light fraction and/or the heavy fraction resulting from stage a), as are described above. The effluent resulting from the hydrotreating unit (I) can advantageously be sent to a stage of removal of at least a part of the water formed during the hydrotreating stage and preferably of all of the water formed, before being sent to the hydroisomerization stage h). The said stage of removal of at least a part of the water can advantageously be carried out by any method and technique known to a person skilled in the art, for example by drying, passing over a desiccant, flash distillation or separation by settling.

Stage h) (Optional)

According to the invention, the process can optionally comprise a stage in which at least a part and preferably all of the effluent resulting from stage g) is sent to a hydroisomerization unit (J) in the presence of a hydroisomerization catalyst comprising at least one noble metal from Group VIII of the Periodic Table and a support comprising and preferably consisting of at least one zeolite IZM-2 and at least one binder, stage h) operating at a temperature of between 200 and 450° C., a pressure of between 1 and 15 MPa, an hourly space velocity of between 0.1 and 10 h$^{-1}$ and a hydrogen flow rate adjusted in order to obtain a ratio of between 100 and 2000 standard litres of hydrogen per litre of feedstock.

Preferably, the said stage h) operates at a temperature of between 250° C. and 450° C. and preferably between 300° C. and 450° C., a pressure of between 1 and 10 MPa and preferably of between 1 and 9 MPa, an hourly space velocity of between 0.2 and 7 h$^{-1}$ and preferably between 0.5 and 5 h$^{-1}$, and a hydrogen flow rate adjusted in order to obtain a ratio of between 150 and 2000 standard litres of hydrogen per litre of feedstock and preferably between 150 and 1500 litres of hydrogen per litre of feedstock.

The catalyst used in the hydroisomerization stage h) comprises and preferably consists of at least one noble metal from Group VIII of the Periodic Table and a support comprising and preferably consisting of at least one zeolite IZM-2 and at least one binder.

The catalyst used in the process according to the invention is advantageously of bifunctional type, that is to say that it has a hydro/dehydrogenating function and a hydroisomerizing function.

Preferably, the noble metal from Group VIII is chosen from ruthenium, rhodium, palladium, osmium, iridium or platinum, taken alone or as a mixture, and preferably from platinum and palladium, taken alone or as a mixture.

The said metal(s) are advantageously used in their reduced form.

Preferably, the content of noble metal of the said catalyst is advantageously between 0.01% and 5% by weight, preferably between 0.1% and 4% by weight and very preferably between 0.1% and 2% by weight, with respect to the total weight of the said catalyst.

According to a preferred form, the said catalyst can also comprise tin in addition to the said noble metal(s), the content of tin preferably being between 0.1% and 0.5% by weight, with respect to the total weight of catalyst.

The zeolite IZM-2 used in the catalyst of stage h) is a crystalline microporous solid exhibiting a crystalline structure described in Patent Application FR 2 918 050. The process for the preparation of the zeolite IZM-2 is also described in the said patent application.

The said solid IZM-2 exhibits a chemical composition, expressed on an anhydrous basis, in terms of moles of oxides, defined by the following general formula: $XO_2$: $aY_2O_3$:$bM_{2/n}O$, in which X represents at least one tetravalent element, Y represents at least one trivalent element and M is at least one alkali metal and/or one alkaline earth metal of valency n. X is preferably chosen from silicon, germanium, titanium and the mixture of at least two of these tetravalent elements; very preferably, X is silicon; and Y is preferably chosen from aluminium, boron, iron, indium and gallium; very preferably, Y is aluminium. M is preferably chosen from lithium, sodium, potassium, calcium, magnesium and the mixture of at least two of these metals, and very preferably M is sodium. Preferably, X represents silicon; the crystalline solid IZM-2 according to the invention is then an entirely silicic solid when the element Y is absent from the composition of the said solid IZM-2. It is also advantageous to employ, as element X, a mixture of several elements X, in particular a mixture of silicon with another element X chosen from germanium and titanium, preferably germanium. Thus, when silicon is present as a mixture with another element X, the crystalline solid IZM-2 according to the invention is then a crystalline metallosilicate exhibiting an X-ray diffraction diagram identical to that described in Table 1 (of FR 2 918 050) when it is in its calcined form. More preferably still and in the presence of an element Y, X being silicon and Y being aluminium: the crystalline solid IZM-2 according to the invention is then an aluminosilicate.

Preferably, the zeolite IZM-2 is in the aluminosilicate form.

Preferably, the molar ratio of the number of silicon atoms to the number of aluminium atoms Si/Al is less than 200, preferably less than 150 and very preferably less than 120.

The zeolite IZM-2 participating in the composition of the support of the catalyst according to the invention is advantageously exchanged via at least one treatment with a solution of at least one ammonium salt so as to obtain the ammonium form of the zeolite IZM-2, which, once calcined, results in the acid ($H^+$) form of the said zeolite IZM-2. This exchange stage can be carried out at any stage of the preparation of the catalyst, that is to say after the stage of preparation of the zeolite IZM-2, after the stage of shaping the zeolite IZM-2 with a a porous inorganic binder, or indeed after the stage of introduction of the hydro/dehydrogenating metal. Preferably, the exchange stage is carried out after the stage of shaping the zeolite IZM-2.

The said zeolite IZM-2 participating in the composition of the support of the catalyst used in the process according to the invention is advantageously at least partially, preferably virtually completely, in the acid form, that is to say in the acid ($H^+$) form.

Preferably, the said catalyst of stage h) comprises from 2% to 80% by weight of zeolite IZM-2, very preferably from 5% to 50% by weight and more preferably from 5% to 30% by weight, with respect to the total weight of the said catalyst.

According to the invention, the support of the catalyst used in the process according to the invention contains a binder. The said binder can advantageously be amorphous or crystalline. Preferably, the said binder is advantageously chosen from the group formed by alumina, silica, silica/alumina, clays, titanium oxide, boron oxide and zirconia, taken alone or as a mixture. Aluminates can also be chosen. Preferably, the said binder of the support is alumina. Preferably, the said binder of the support is a matrix containing alumina in all its forms known to a person skilled in the art, such as, for example, aluminas of $\alpha$, $\gamma$, $\eta$ or $\delta$ type. The said aluminas differ in their specific surface and their pore volume. The said binder of the support is preferably provided in the form of beads, grains or extrudates.

Preferably, the said catalyst comprises from 5% to 98% by weight of binder, very preferably from 10% to 95% by weight and more preferably from 20% to 95% by weight, with respect to the total weight of the said catalyst.

The support of the catalyst used in stage h) according to the invention can advantageously be prepared according to any method well known to a person skilled in the art.

According to a preferred method of preparation, the said crystalline zeolite IZM-2 can advantageously be introduced during the dissolution or suspending of the alumina compounds advantageously used according to the invention. The said crystalline zeolite IZM-2 can, without this being limiting, for example be in the form of a powder, ground powder, suspension or suspension which has undergone a deagglomeration treatment. Thus, for example, the said crystalline zeolite can advantageously be placed in acidified or non-acidified suspension at a concentration adjusted to the final content of solid IZM-2 targeted in the catalyst used according to the present invention. This suspension, commonly known as a slip, is then mixed with the alumina compounds.

The support of the catalyst used in stage h) according to the invention can advantageously be shaped via any technique known to a person skilled in the art. The shaping can advantageously be carried out, for example, by extrusion, by pelleting, by the oil drop method, by rotating plate granulation or by any other method well known to a person skilled in the art.

The shaping can also advantageously be carried out in the presence of the different constituents of the catalyst and extrusion of the inorganic paste obtained, by pelleting, shaping in the form of beads with a rotary coating device or with a drum, drop coagulation, oil drop, oil up or any other known process for the agglomeration of a powder containing alumina and optionally other ingredients chosen from those mentioned above.

Furthermore, the supports employed in the process according to the present invention can advantageously have been treated, as is well known to a person skilled in the art, with additives in order to facilitate the shaping and/or to improve the final mechanical properties of the supports. Mention may in particular be made, as examples of additives, of cellulose, carboxymethylcellulose, carboxyethylcellulose, tall oil, xanthan gums, surface-active agents, flocculating agents, such as polyacrylamides, carbon black, starches, stearic acid, polyacrylic alcohol, polyvinyl alcohol, biopolymers, glucose, polyethylene glycols, and the like.

The extrusion can advantageously be carried out with any conventional commercially available device. The paste resulting from the kneading is advantageously extruded through a die, for example using a piston, a single extruding screw or twin extruding screws. This extrusion stage can advantageously be carried out by any method known to a person skilled in the art.

The support of the catalyst employed in stage h) according to the present invention is subsequently advantageously subjected to a drying stage carried out according to any technique known to a person skilled in the art.

Preferably, the drying is carried out under a stream of air. The said drying can also advantageously be carried out under a stream of any oxidizing, reducing or inert gas.

Preferably, the drying is advantageously carried out between 50 and 180° C., preferably between 60 and 150° C. and very preferably between 80 and 130° C.

The said support, optionally dried, is subsequently preferably subjected to a calcination stage.

The said calcination stage is advantageously carried out in the presence of molecular oxygen, for example by flushing with air, at a temperature advantageously of greater than 200° C. and less than or equal to 1100° C. The said calcination stage can advantageously be carried out in a traversed bed, in a swept bed or under a static atmosphere. For example, the oven used can be a rotary oven or can be a vertical oven comprising radial traversed layers. Preferably, the said calcination stage is carried out for between more than one hour at 200° C. and less than one hour at 1100° C. The calcination can advantageously be carried out in the presence of steam and/or in the presence of an acidic or basic vapour. For example, the calcination can be carried out under a partial pressure of ammonia.

Post-calcination treatments can optionally be carried out, so as to improve the properties, for example the textural properties, of the support.

The IZM-2/binder support of the catalyst employed in stage h) according to the present invention can thus optionally be subjected to a hydrothermal treatment in a confined atmosphere. The term "hydrothermal treatment in a confined atmosphere" is understood to mean a treatment by passing to an autoclave in the presence of water at a temperature greater than ambient temperature.

During this hydrothermal treatment, the support can advantageously be treated. Thus, the support can advantageously be impregnated, prior to its treatment in the autoclave, the autoclaving being performed either in the vapour phase or in the liquid phase, it being possible for this vapour or liquid phase of the autoclave to be acidic or non-acidic. This impregnation, prior to the autoclaving, can advantageously be acidic or non-acidic. This impregnation, prior to the autoclaving, can advantageously be carried out dry or by immersion of the support in an acidic aqueous solution. The term "dry impregnation" is understood to mean bringing the support into contact with a volume of solution less than or equal to the total pore volume of the support. Preferably, the impregnation is carried out dry. The autoclave is preferably a rotating basket autoclave, such as that defined in Patent Application EP-A-0 387 109.

The temperature during the autoclaving can be between 100 and 250° C. for a period of time of between 30 minutes and 3 hours.

The hydro/dehydrogenating function can advantageously be introduced at any stage of the preparation, very preferably after shaping the said IZM-2/binder support. The shaping is advantageously followed by a calcination; the hydro/dehydrogenating function can also advantageously be introduced before or after this calcination. The preparation is generally terminated by a calcination at a temperature of 250 to 600° C. Another of the preferred methods according to the present invention advantageously consists in shaping the IZM-2/binder support after a kneading of the latter and then passing the paste thus obtained through a die in order to form extrudates. The hydro/dehydrogenating function can advantageously be then introduced, in part only or in its entirety, at the time of the kneading. It can also advantageously be introduced by one or more ion-exchange operations on the calcined support.

Preferably, the support is impregnated with an aqueous solution. The impregnation of the support is preferably carried out by the "dry" impregnation method well known to a person skilled in the art. The impregnation can advantageously be carried out in a single stage with a solution containing all of the constituent elements of the final catalyst.

The hydro/dehydrogenating function can advantageously be introduced by one or more operations of impregnation of the shaped and calcined support with a solution containing at least one precursor of at least one oxide of at least one metal chosen from the noble metals of Group VIII.

The noble metals of Group VIII of the catalyst of the present invention can advantageously be present completely or partially in the metallic and/or oxide form.

The sources of noble elements of Group VIII which can advantageously be used are well known to a person skilled in the art. For the noble metals, halides, for example chlorides, nitrates, acids, such as chloroplatinic acid, hydroxides or oxychlorides, such as ammoniated ruthenium oxychloride, are used. Use may also advantageously be made of cationic complexes, such as ammonium salts, when it is desired to deposit platinum on the solid IZM-2 by cation exchange.

The catalysts thus obtained are shaped in the form of grains with different shapes and dimensions. They are generally used in the form of cylindrical extrudates or polylobal extrudates, such as bilobal, trilobal or polylobal extrudates, of straight or twisted form, but can optionally be manufactured and employed in the form of crushed powders, lozenges, rings, beads or wheels. Techniques other than extrusion, such as pelleting or coating, can advantageously be used.

Preferably, the catalysts employed in the process according to the invention are in the form of spheres or of extrudates. However, it is advantageous for the catalyst to be in the form of extrudates with a diameter of between 0.5 and 5 mm and more particularly between 0.7 and 2.5 mm. The shapes are cylindrical (which may or may not be hollow), twisted cylindrical, multilobal (for example 2, 3, 4 or 5 lobes) or annular. The cylindrical shape is advantageously preferably used but any other shape can advantageously be used.

The noble metal present in the said catalyst is advantageously in the reduced form. The reduction of the metal is advantageously carried out by treatment under hydrogen at a temperature of between 150° C. and 650° C. and a total pressure of between 0.1 and 25 MPa. For example, a reduction consists of a stationary phase at 150° C. for two hours, then a rise in temperature up to 450° C. at the rate of 1° C./min and then a stationary phase of two hours at 450° C.; throughout this reduction stage, the hydrogen flow rate is 1000 standard $m^3$ of hydrogen per $m^3$ of catalyst and the total pressure is kept constant at 0.1 MPa. Any ex situ reduction method can advantageously be envisaged.

The operating conditions employed in stage h) make it possible to obtain an isomerized effluent containing little in the way of or no longer containing olefinic compounds and oxygen-comprising compounds.

Stage i) (Optional)

At least a part and preferably all of the isomerized effluent resulting from stage h) is sent to a fractionation unit (G), as a mixture with the effluent resulting from the hydrocracking/hydroisomerization unit (F) (stage d)), in order to obtain at least a middle distillates fraction, a naphtha cut having a maximum boiling point of less than 180° C. and a converted heavy fraction, under the same operating conditions described in stage e) above.

BRIEF DESCRIPTION OF THE FIGURES

In FIGS. 1, 2, 3 and 4, the same references denote identical or analogous elements.

In FIG. 1, the synthesis gas 1, a gas composed predominantly of carbon monoxide and of hydrogen, is directed to a Fischer-Tropsch synthesis unit (A). The gas fraction under the operating conditions of the Fischer-Tropsch synthesis is composed of the unconverted gas fraction, of the light hydrocarbons part and of the water formed by the Fischer-Tropsch synthesis. These three phases are separated by cooling and then flash distillation. The gas fraction is preferably recycled with the synthesis gas 1 so as to increase the total conversion and the material yield. The aqueous fraction is treated before being returned to the process or to the outside. For its part, the light fraction 2, or condensate, is sent to a hydrotreating unit (B). This hydrotreating stage is optional. The effluent 3 resulting from the hydrotreating stage no longer contains olefinic compounds and oxygen-comprising compounds. The effluent 3 resulting from the hydrotreating stage is sent to a unit for the catalytic cracking of naphtha (C), after removal of the water and of the gas fraction containing hydrogen, carbon monoxide and carbon dioxide. The effluent 4 produced by the sequence of the stage of hydrotreating and of catalytic cracking of naphtha predominantly contains compounds which are gaseous under standard conditions, i.e. at a temperature of 20° C. and at atmospheric pressure (1013.25 hPa). The effluent 4 is sent to a separation unit (D) in order to recover at least a light hydrocarbons fraction 5, at least an olefinic fraction 6 and at least a residual liquid fraction 7. The separation is carried out by any process known to a person skilled in the art but more particularly by a succession of distillations. A part of the liquid fraction 7 can be recycled to the unit for the catalytic cracking of naphtha (C) via the line 8.

Figure 1:
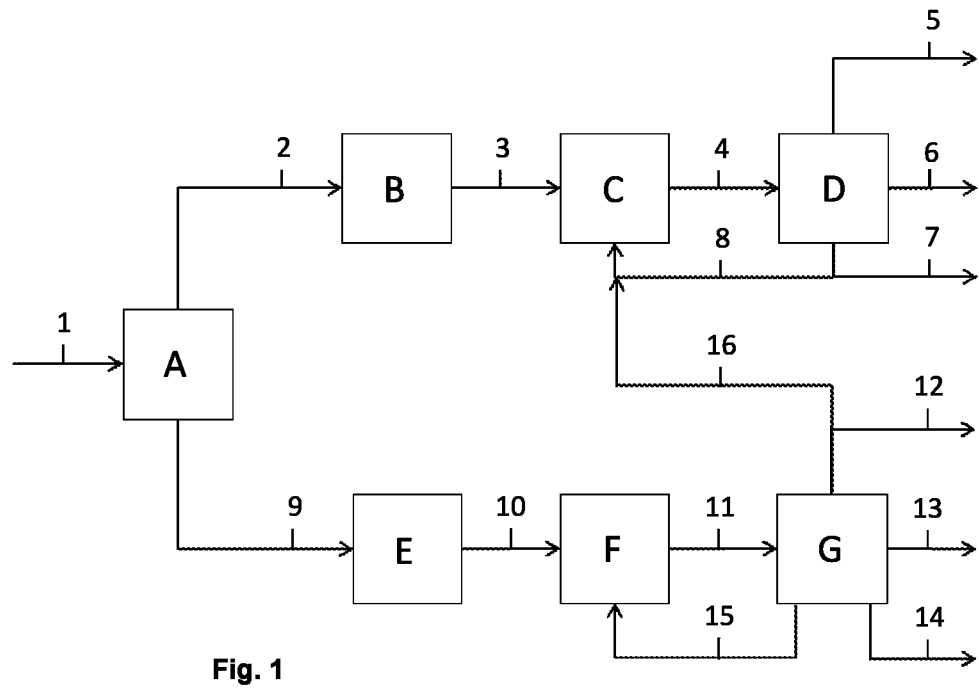
FIG. 1 illustrates an embodiment in which all of the light fraction of the condensate is sent to a naphtha catalytic cracking unit (C).

The heavy fraction 9 resulting from the Fischer-Tropsch synthesis corresponds to the liquid fraction under the operating conditions of the reaction section. The heavy cut 9 can be directed to a hydrotreating unit (E). This hydrotreating stage is optional as this part of the effluent contains little in the way of olefins and little in the way of oxygen-comprising compounds, which compounds are mainly present in the light fraction 2 produced by the Fischer-Tropsch synthesis. The effluent 10 is sent, after removal of the water, to a hydrocracking/hydroisomerization unit (F). The effluent 11 resulting from the sequence of the hydrotreating and hydrocracking/hydroisomerization stages is sent to a separation unit (G). The separation is carried out by any process known to a person skilled in the art but more particularly by distillation. On conclusion of this separation stage, four main streams are produced: a light cut 12 similar to a naphtha, the maximum boiling point of which is less than 180° C., an intermediate cut 13 equivalent to a kerosene with an initial boiling point of greater than 120° C. and a final boiling point of less than 250° C., a heavy cut 14, equivalent of a gas oil composed of product with boiling points of between 120° C. and 370° C., and a very heavy cut 15 corresponding to the fraction not converted in the hydrocracking/hydroisomerization stage. This effluent 15 can be recycled to the hydrocracking/hydroisomerization unit (F). The cut 12 can be sent, completely or partially, to the catalytic cracking unit (C), via the line 16, in order to maximize the yield of light olefins resulting from the process for the catalytic cracking of naphtha.

Figure 2:
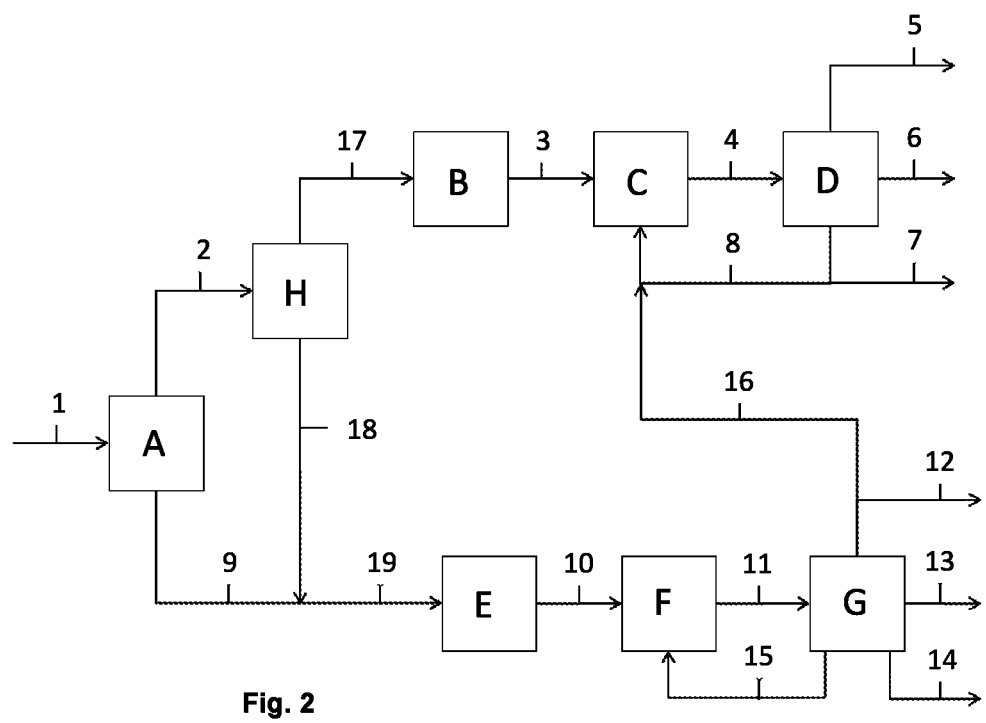
FIG. 2 illustrates an embodiment in which the light fraction of the condensate is fractionated in order to obtain a light cut of the said light fraction, the final boiling point of which is less than 180° C., and a heavy cut of the said light fraction, the initial boiling point of which is greater than 120° C. In this embodiment, the light cut of the light fraction is sent to a catalytic cracking unit (C) and the heavy cut of the light fraction is sent to a hydrocracking/hydroisomerization unit (F), as a mixture with the heavy fraction of waxes.

In FIG. 2, the synthesis gas 1 is directed to a Fischer-Tropsch synthesis unit (A). The light fraction 2, or condensate, is sent to a separation unit (H). The separation is carried out by any process known to a person skilled in the art but more particularly by distillation. The separation is carried out so as to obtain a light cut 17, the final boiling point of which is less than 180° C., and a heavy cut 18, the initial boiling point of which is greater than 120° C. The light cut 17 is sent to the hydrotreating unit (B). This hydrotreating stage is optional. The effluent 3 resulting from the hydrotreating stage no longer contains olefinic compounds and oxygen-comprising compounds. The effluent 3 resulting from the hydrotreating stage is sent to a unit for the catalytic cracking of naphtha (C), after removal of the water and of the gas fraction containing hydrogen, carbon monoxide and carbon dioxide. The effluent 4 produced by the sequence of the stage of hydrotreating and of catalytic cracking of naphtha predominantly contains compounds which are gaseous under standard conditions, i.e. at a temperature of 20° C. and at atmospheric pressure (1013.25 hPa). The effluent 4 is sent to a separation unit (D) in order to recover a light hydrocarbons fraction 5, an olefinic fraction 6 and a residual liquid fraction 7. All or a part of the liquid fraction 7 can be recycled to the unit for the catalytic cracking of naphtha (C) via the line 8.

The heavy fraction 9 resulting from the Fischer-Tropsch synthesis corresponds to the liquid fraction under the operating conditions of the reaction section. This fraction is mixed with the cut 18 resulting from the separation unit (H) in order to form the stream 19. The stream 19 can be directed to a hydrotreating unit (E). This hydrotreating stage is optional as this part of the effluent contains little in the way of olefins and little in the way of oxygen-comprising compounds, which compounds are mainly present in the light fraction 2 produced by the Fischer-Tropsch synthesis. The effluent 10 is sent, after removal of the water, to a hydrocracking/hydroisomerization unit (F). The effluent 11 resulting from the sequence of the hydrotreating and hydrocracking/hydroisomerization stages is sent to a separation unit (G). The separation is carried out by any process known to a person skilled in the art but more particularly by distillation. On conclusion of this separation stage, four main streams are produced: a light cut 12 similar to a naphtha, the maximum boiling point of which is less than 180° C., an intermediate cut 13, equivalent to a kerosene with an initial boiling point of greater than 120° C. and a final boiling point of less than 250° C., a heavy cut 14, equivalent of a gas oil composed of product with boiling point of between 120° C. and 370° C., and a very heavy cut 15 corresponding to the fraction not converted in the hydrocracking/hydroisomerization stage. This effluent 15 can be recycled to the hydrocracking/hydroisomerization unit (F). The cut 12 can be sent, completely or partially, to the catalytic cracking unit (C), via the line 16, in order to maximize the yield of light olefins resulting from the process for the catalytic cracking of naphtha.

Figure 3:
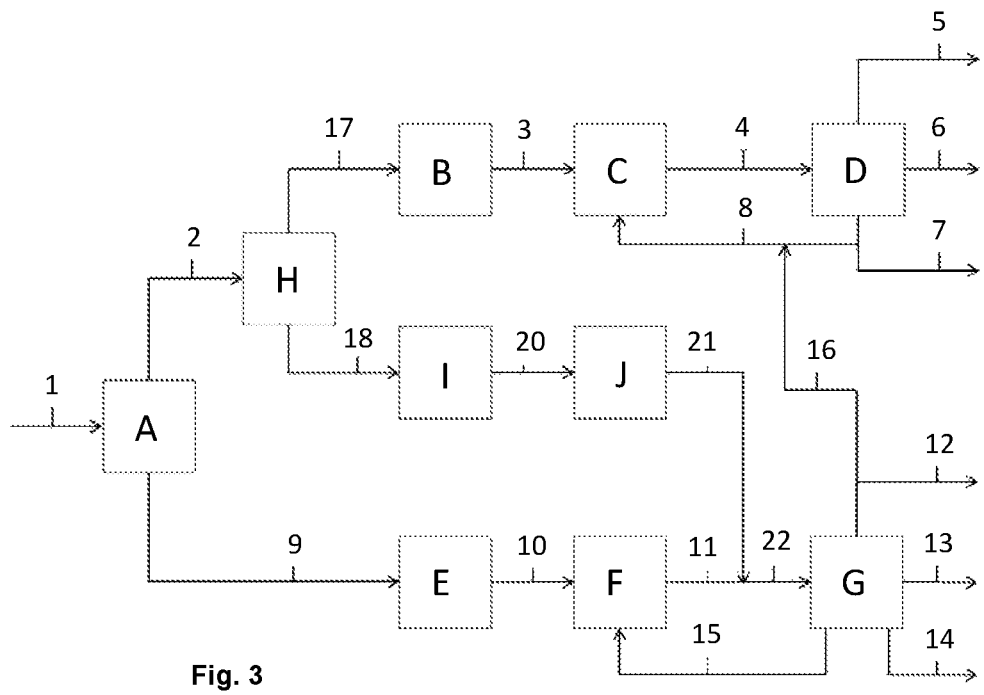
FIG. 3 illustrates an embodiment in which the light fraction of the condensate is fractionated in order to obtain a light cut of the said light fraction, the final boiling point of which is less than 180° C., and a heavy cut of the said light fraction, the initial boiling point of which is greater than 120° C. In this embodiment, the light cut of the light fraction is sent to a catalytic cracking unit (C) and the heavy cut of the light fraction is sent to a hydrotreating unit (I) and then to a hydroisomerization unit (J).

In FIG. 3, the synthesis gas 1 is directed to a Fischer-Tropsch synthesis unit (A). The light fraction 2, or condensate, is sent to a separation stage (H). The separation is carried out by any process known to a person skilled in the art but more particularly by distillation. The separation is carried out so as to obtain a light cut 17, the final boiling point of which is less than 180° C., and a heavy cut 18, the initial boiling point of which is greater than 120° C. The light cut 17 is sent to the hydrotreating unit (B). This hydrotreating stage is optional. The effluent 3 resulting from the hydrotreating stage no longer contains olefinic compounds and oxygen-comprising compounds. The effluent 3 resulting from the hydrotreating stage is sent to a unit for the catalytic cracking of naphtha (C), after removal of the water and of the gas fraction containing hydrogen, carbon monoxide and carbon dioxide. The effluent 4 produced by the sequence of the stage of hydrotreating and of catalytic cracking of naphtha predominantly contains compounds which are gaseous under standard conditions, i.e. at a temperature of 20° C. and at atmospheric pressure (1013.25 hPa). The effluent 4 is sent to a separation unit (D) in order to recover a light hydrocarbons fraction 5, an olefinic fraction 6 and a residual liquid fraction 7. All or a part of the liquid fraction 7 can be recycled to the unit for the catalytic cracking of naphtha (C) via the line 8.

The heavy cut 18 resulting from the separation stage is sent to a hydrotreating unit (I). The effluent 20 resulting from the hydrotreating stage no longer contains olefinic compounds and oxygen-comprising compounds. The effluent 20 resulting from the hydrotreating stage is sent to a hydroisomerization unit (J).

The heavy fraction 9 resulting from the Fischer-Tropsch synthesis corresponds to the liquid fraction under the operating conditions of the reaction section. The heavy fraction 9 can be directed to a hydrotreating unit (E). This hydrotreating stage is optional as this part of the effluent contains little in the way of olefins and little in the way of oxygen-comprising compounds, which compounds are mainly present in the light cut produced by the Fischer-Tropsch synthesis. The effluent 10 is sent, after removal of the water, to a hydrocracking/hydroisomerization unit (F). The effluent 11 resulting from the sequence of the hydrotreating and hydrocracking/hydroisomerization stages is mixed with the effluent 21 resulting from the hydroisomerization unit (J). The mixture 22 is sent to a separation unit (G). The separation is carried out by any process known to a person skilled in the art but more particularly by distillation. On conclusion of this separation stage, four main streams are produced: a light cut 12 similar to a naphtha, the maximum boiling point of which is less than 180° C., an intermediate cut 13, equivalent to a kerosene with an initial boiling point of greater than 120° C. and a final boiling point of less than 250° C., a heavy cut 14, equivalent of a gas oil composed of product with boiling points of between 120° C. and 370° C., and a very heavy cut 15 corresponding to the fraction not converted in the hydrocracking/hydroisomerization stage. This effluent 15 can be recycled to the hydrocracking/hydroisomerization unit (F). The cut 12 can be sent, completely or partially, to the catalytic cracking unit (C), via the line 16, in order to maximize the yield of light olefins resulting from the process for the catalytic cracking of naphtha.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding application No. FR 1856667, filed Jul. 18, 2018 are incorporated by reference herein.

The examples illustrate the invention without limiting the scope thereof.

EXAMPLES

Example 1 (in Accordance with the Invention)

Example 1 illustrates the embodiment according to FIG. 1.

The effluent resulting from the Fischer-Tropsch synthesis unit comprises two fractions: a light fraction, known as condensate, and a heavy fraction, known as waxes. The characteristics of the light fraction resulting from the Fischer-Tropsch synthesis are given in Table 1 below.

TABLE 1

| Composition of the light fraction | | |
|---|---|---|
| | Unit | Content |
| Paraffins | [wt %] | 73 |
| Olefins | [wt %] | 20 |
| Oxygen-comprising compounds | [wt %] | 7 |

The light fraction and heavy fraction are respectively sent to a stage of hydrotreating in the presence of a hydrotreating catalyst comprising 11.4 wt % of NiO and 8% by weight of $MoO_3$ on an alumina support and which operates at a temperature of 330° C., at a pressure of 0.65 MPa, at a hydrogen flow rate adjusted in order to obtain a ratio of 600 standard litres per litre, and at an hourly space velocity of 2 $h^{-1}$.

The hydrotreated light fraction, the final boiling point of which is less than 370° C., is sent to the catalytic cracking stage b). This stage is carried out at high severity (T=650° C., C/O=15) in the presence of a catalyst 100% composed of ZSM-5.

The hydrotreated heavy fraction is sent to a stage d) of hydrocracking and of hydroisomerization in the presence of a hydrocracking and hydroisomerization catalyst comprising 0.3% by weight of Pt on a SiAl support and which operates at a temperature of 360° C., at a pressure of 0.65 MPa, at an hourly space velocity of 2 $h^{-1}$, and at a hydrogen flow rate adjusted in order to obtain a ratio of 600 standard litres of hydrogen per litre of feedstock.

The effluent resulting from the hydrocracking and hydroisomerization stage d) is subsequently sent to the fractionation stage e) in order to separate a petrol fraction, a middle distillates fraction (kerosene and gas oil), an unconverted fraction and a naphtha cut which is sent to the catalytic cracking stage b).

The effluent resulting from the catalytic cracking unit is subsequently sent to stage c) in order to obtain at least a fraction comprising light hydrocarbons, at least an olefinic fraction and at least a residual liquid fraction.

The material balance according to the scheme is given in Table 2 below. As the hydrogen consumption is very low, it is disregarded in this example.

TABLE 2

Material balance according to the scheme, with reference to the stream of FIG. 1

| Description (Stream) | [—] | Condensate (2) | Olefins (6) | Light hydrocarbons (5) | Residual liquid fraction (7) |
|---|---|---|---|---|---|
| Flow rate | [t/h] | 55 | 34 | 8 | 13 |

The flow rate of olefins is increased by 17 wt % with respect to Example 2 illustrating a scheme not in accordance with the invention.

Example 2 (not in Accordance with the Invention)

Figure 4:
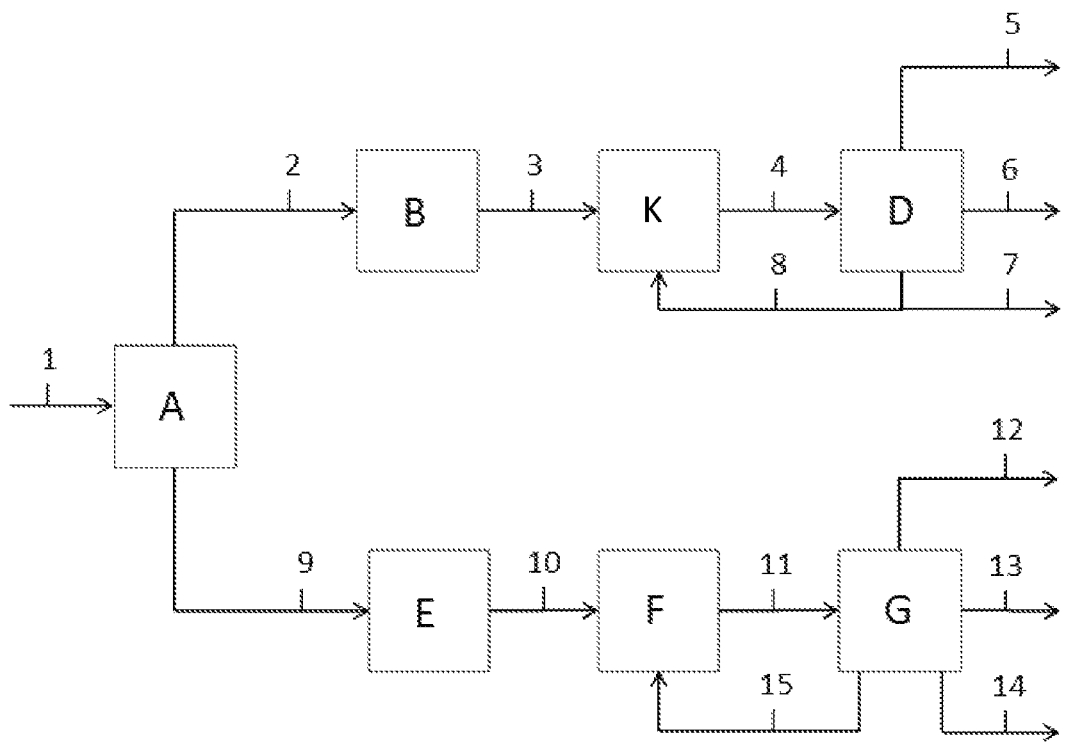
FIG. 4 is a diagrammatic representation of a process according to the prior art in which the light fraction resulting from the Fischer-Tropsch synthesis is sent to a steam cracking unit.

Example 2 is not in accordance with the invention in that the light fraction resulting from the Fischer-Tropsch synthesis is sent to a steam cracking unit (temperature: 850° C.; pressure: 0.25 MPa; steam content: 0.25% by weight) according to a scheme represented in FIG. 4. Furthermore, the cut similar to the naphtha cut resulting from the unit for fractionation (G) of the hydrocracking/hydroisomerization effluent is not sent to the steam cracking unit.

The operating conditions and the catalysts used in Example 2 are identical to those used in Example 1 according to the invention in the hydrocracking and hydroisomerization stages. The material balance according to the scheme is given in Table 3.

TABLE 3

Material balance according to the scheme of the prior art with reference to the streams of FIG. 4

| Description | [—] | Condensate (2) | Olefins (6) | Light hydrocarbons (5) | Residual liquid fraction (7) |
|---|---|---|---|---|---|
| Flow rate | [t/h] | 55 | 29 | 13 | 13 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. Process for the production of olefins and of middle distillates from a paraffinic feedstock produced by Fischer-Tropsch synthesis comprising at least the following stages:
   a) the said paraffinic feedstock resulting from a Fischer-Tropsch unit (A) is recovered, the said paraffinic feedstock comprising at least a light fraction, known as condensate, and a heavy fraction, known as waxes;
   b) at least a part of the said light fraction is sent to a catalytic cracking unit (C);
   c) the effluent resulting from the catalytic cracking unit is separated in a fractionation unit (D) in order to obtain at least a fraction comprising light hydrocarbons, at least an olefinic fraction and at least a residual liquid fraction;
   d) at least a part of the said heavy fraction is sent to a hydrocracking/hydroisomerization unit (F) in the presence of hydrogen and of a hydrocracking/hydroisomerization catalyst;
   e) the effluent resulting from the hydrocracking/hydroisomerization unit is separated in a fractionation unit (G) in order to obtain a middle distillates fraction, a naphtha cut having a maximum boiling point of less than 180° C. and an unconverted heavy fraction;
   f) at least a part of the said naphtha cut resulting from the fractionation unit is sent to the catalytic cracking unit.

2. Process according to claim 1, in which:
   an additional stage a') is carried out in which the said light fraction obtained in stage a) is fractionated in a fractionation unit (H) in order to obtain a light cut of the said light fraction, the final boiling point of which is less than 180° C., and a heavy cut of the said light fraction, the initial boiling point of which is greater than 120° C.;
   a stage b) is carried out in which the said light cut of the said light fraction resulting from stage a') is sent to the said catalytic cracking unit (C).

3. Process according to claim 2, in which an additional stage a") is carried out in which the said heavy cut of the said light fraction obtained on conclusion of stage a') is sent to the said hydrocracking/hydroisomerization unit (F), as a mixture with the said heavy fraction resulting from stage a).

4. Process according to claim 2, in which a stage g) is carried out in which the said heavy cut of the said light fraction obtained on conclusion of stage a') is sent to a hydrotreating unit (I) in order to obtain a hydrotreated heavy cut of the said light fraction.

5. Process according to claim 4, in which a stage h) is carried out in which the said hydrotreated heavy cut of the said light fraction obtained on conclusion of stage g) is sent to the isomerization unit (J).

6. Process according to claim 5, in which a stage i) is carried out in which the effluent resulting from the isomerization unit (J) of stage h) is sent to the fractionation unit (G), as a mixture with the effluent resulting from the hydrocracking/hydroisomerization unit (F).

7. Process according to claim 6, in which the catalyst of the isomerization unit (J) comprises at least one noble metal from Group VIII and a support comprising at least one IZM-2 zeolite and at least one binder.

8. Process according to claim 1, in which the said light fraction and/or the said heavy fraction obtained on conclusion of stage a) is/are sent, before stage b), to a hydrotreating unit.

9. Process according to claim 1, in which the said residual liquid fraction obtained on conclusion of stage c) is recycled, at least in part, in stage b).

10. Process according to claim 1, in which the said unconverted heavy fraction obtained on conclusion of stage e) is recycled, at least in part, in stage d).

11. Process according to claim 1, in which all of the said naphtha cut resulting from the fractionation unit is sent to the catalytic cracking unit.

12. Process according to claim 1, in which the catalytic cracking unit comprises a catalyst comprising a ZSM-5 zeolite.

13. Process according to claim 1, in which the catalyst of the hydrocracking/hydroisomerization unit (C) comprises at least one hydro/dehydrogenating metal chosen from the group formed by the metals of Group VIb and of Group VIII and at least one Bronsted acid solid.

* * * * *